(12) United States Patent
Ye et al.

(10) Patent No.: US 8,770,782 B2
(45) Date of Patent: Jul. 8, 2014

(54) ILLUMINATION DEVICE CAPABLE OF BEING CONTROLLED BY BLOW

(75) Inventors: Zhi-Ting Ye, Miaoli County (TW); Chin-Liang Chen, Taichung (TW); Ming-Chuan Lin, Taichung (TW); Tsung-Wen Chen, Changhua County (TW)

(73) Assignees: Dongguan Masstop Liquid Crystal Display Co., Ltd., Dongcheng District, Dongguan, Guangdong Province (CN); Wintek Corporation, Tanzi Dist., Taichung (TW)

( * ) Notice: Subject to any disclaimer, the term of this patent is extended or adjusted under 35 U.S.C. 154(b) by 181 days.

(21) Appl. No.: 13/473,581

(22) Filed: May 16, 2012

(65) Prior Publication Data

US 2013/0099667 A1    Apr. 25, 2013

(30) Foreign Application Priority Data

Oct. 21, 2011   (TW) .............................. 100219918 U

(51) Int. Cl.
*F21L 19/00* (2006.01)

(52) U.S. Cl.
USPC ........... 362/161; 362/186; 362/383; 362/373; 362/375; 315/86

(58) Field of Classification Search
USPC .................. 362/161, 186, 294, 373, 375, 383
See application file for complete search history.

(56) References Cited

U.S. PATENT DOCUMENTS

| 8,496,345 B2 * | 7/2013 | Chan .............................. 362/161 |
| 2009/0067182 A1 * | 3/2009 | Hsu et al. ....................... 362/373 |
| 2012/0162965 A1 * | 6/2012 | Takeuchi et al. ................. 362/84 |

* cited by examiner

*Primary Examiner* — Vibol Tan
(74) *Attorney, Agent, or Firm* — Winston Hsu; Scott Margo

(57) ABSTRACT

An illumination device capable of being controlled by blow includes a casing, a light emitting module, a driving circuit board and a blow sensing module. At least one air hole is formed on a periphery of the casing. The light emitting module is disposed on a top of the casing. The driving circuit board is disposed in the casing and electrically connected to the light emitting module. The blow sensing module is disposed in the casing, electrically connected to the driving circuit board and used for sensing blow through the at least one air hole. The driving circuit board controls the light emitting module to emit light in different brightness according to a number of blows sensed by the blow sensing module.

6 Claims, 3 Drawing Sheets

ILLUMINATION DEVICE CAPABLE OF BEING CONTROLLED BY BLOW

BACKGROUND OF THE INVENTION

1. Field of the Invention

The invention relates to an illumination device and, more particularly, to an illumination device capable of being controlled by blow.

2. Description of the Prior Art

So far an illumination device is considered a necessity by a lot of people. In general, the illumination device can be switched on/off by pressing a corresponding button switch or a remote controller manually. When both hands of a user are busy, the user cannot switch on/off the illumination device accordingly. Furthermore, the heat dissipating area of a heat sink within the illumination device cannot increase due to appearance and space limitations, such that the life of electronic components within the illumination device may decrease due to accumulated heat. Moreover, since the conventional illumination device cannot emit light during power failure, it is very inconvenient for the user.

SUMMARY OF THE INVENTION

An objective of the invention is to provide an illumination device capable of being controlled by blow.

Another objective of the invention is to provide an illumination device equipped with a cover made of ceramic material for the purpose of heat dissipation.

Another objective of the invention is to provide an illumination device equipped with a power storage module for supplying power to the illumination device during power failure.

According to one embodiment of the invention, an illumination device capable of being controlled by blow comprises a casing, a light emitting module, a driving circuit board and a blow sensing module. At least one air hole is formed on a periphery of the casing. The light emitting module is disposed on a top of the casing. The driving circuit board is disposed in the casing and electrically connected to the light emitting module. The blow sensing module is disposed in the casing, electrically connected to the driving circuit board, and used for sensing blow through the at least one air hole. The driving circuit board controls the light emitting module to emit light in different brightness according to a number of blows sensed by the blow sensing module.

In this embodiment, the illumination may further comprise a cover, wherein the cover has an opening, the casing is disposed in the cover and a part of the casing is exposed within the opening. The casing may be made of metal material and the cover may be made of ceramic material. The casing contacts the cover partially so as to conduct heat generated by the light emitting module from the casing to the cover and then dissipate the heat out of the illumination device through the cover.

In this embodiment, the illumination device may further comprise a power storage module disposed in the casing, electrically connected to the driving circuit board, and used for supply power to the driving circuit board during power failure. The driving circuit board can switch on the light emitting module in full brightness or switch off the light emitting module according to the number of blows sensed by the blow sensing module during power failure.

As mentioned in the above, the illumination device of the invention utilizes the blow sensing module to sense blow and controls the light emitting module to emit light in different brightness according to the number of blows sensed by the blow sensing module. Furthermore, the illumination device of the invention may be equipped with a cover made of ceramic material for the purpose of heat dissipation, such that the life of electronic components within the illumination device can increase. Moreover, the illumination device of the invention may be equipped with a power storage module so as to enable the illumination device to work normally during power failure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
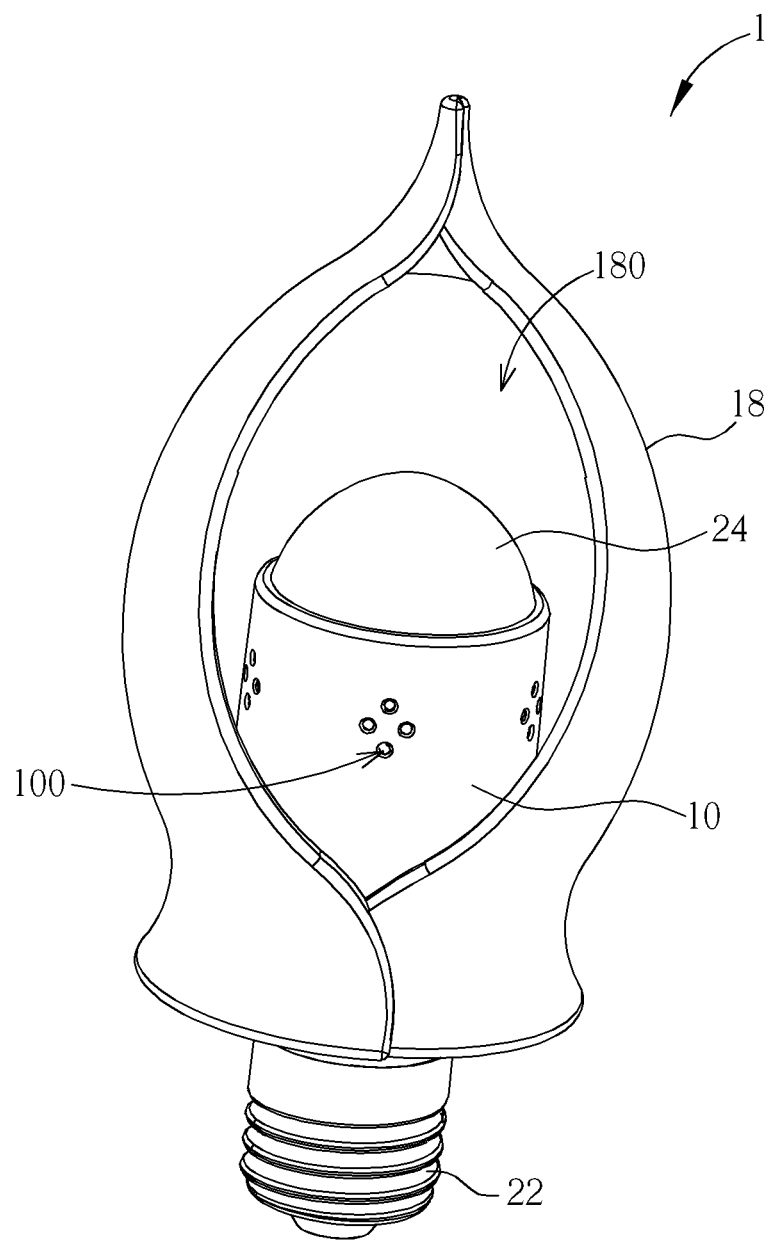
FIG. 1 is a perspective view illustrating an illumination device capable of being controlled by blow according to one embodiment of the invention.
Figure 2:
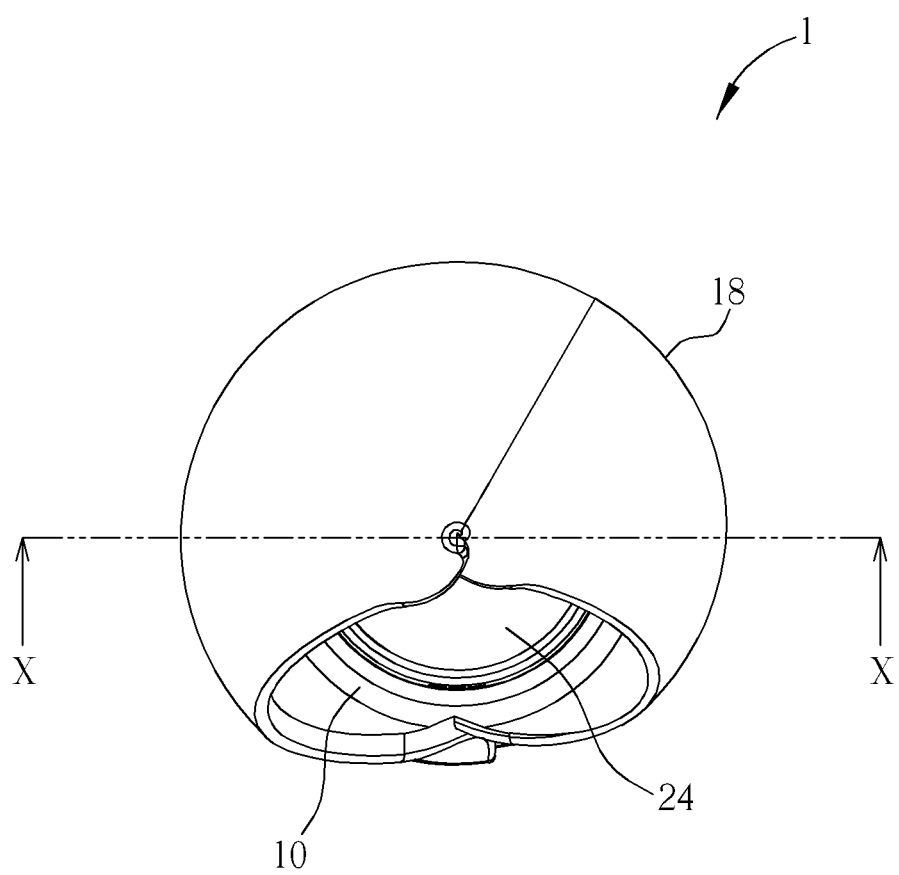
FIG. 2 is a top view illustrating the illumination device shown in FIG. 1.
Figure 3:
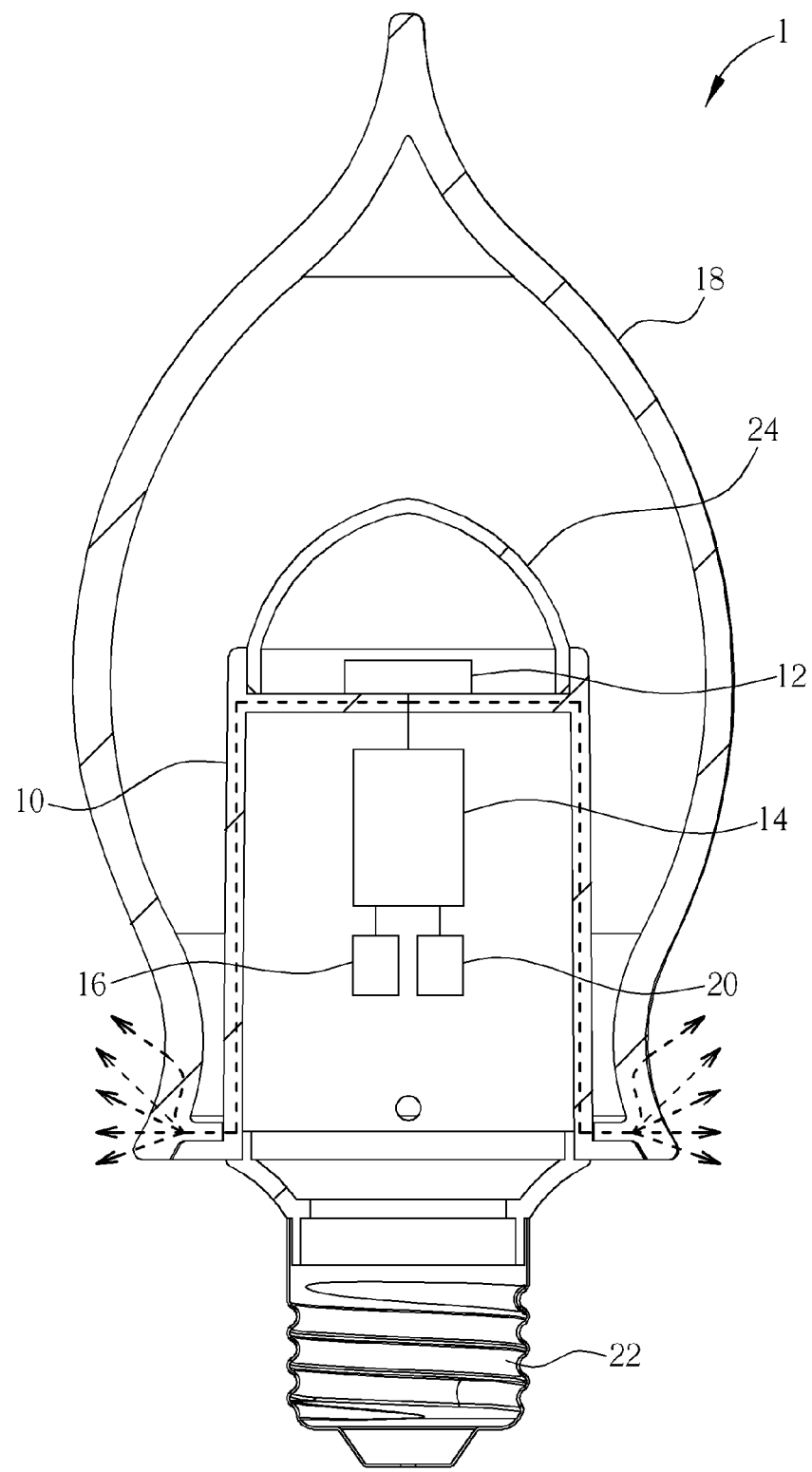
FIG. 3 is a cross-sectional view illustrating the illumination device along line X-X shown in FIG. 2.

Referring to FIGS. 1 to 3, FIG. 1 is a perspective view illustrating an illumination device 1 capable of being controlled by blow according to one embodiment of the invention, FIG. 2 is a top view illustrating the illumination device 1 shown in FIG. 1, and FIG. 3 is a cross-sectional view illustrating the illumination device 1 along line X-X shown in FIG. 2. As shown in FIGS. 1 to 3, the illumination device 1 comprises a casing 10, a light emitting module 12, a driving circuit board 14, a blow sensing module 16, a cover 18, a power storage module 20, a lamp socket 22 and a lamp lens 24.

At least one air hole 100 is formed on a periphery of the casing 10. The number, position and shape of air holes 100 can be determined according to practical applications and are not limited to the embodiment shown in FIG. 1. The light emitting module 12 is disposed on a top of the casing 10. The lamp lens 24 is disposed on the casing 10 and covers light emitting module 12. In this embodiment, the light emitting module 12 may comprise a plurality of light emitting diodes or other light sources. The driving circuit board 14, the blow sensing module 16 and the power storage module 20 are disposed in the casing 10, wherein the driving circuit board 14 is electrically connected to the light emitting module 12, the blow sensing module 16 and the power storage module 20, as shown in FIG. 3. In this embodiment, the blow sensing module 16 may be, but not limited to, a microphone, and the power storage module 20 may be, but not limited to, a battery or a set of batteries. The cover 18 has an opening 180, the casing 10 is disposed in the cover 18, and a part of the casing 10 is exposed within the opening 180, as shown in FIG. 1. In this embodiment, the cover 18 may be, but not limited to, transparent so that light emitted by the light emitting module 12 can pass through the cover 18. The lamp socket 22 is fixed on a bottom of the casing 10. The illumination device 1 can be installed on a lamp holder (not shown) through the lamp socket 22. In practical applications, at least one electric wire (not shown) is disposed in the lamp socket 22 and electrically connected to the driving circuit board 14 so as to conduct power from the lamp holder to the driving circuit board 14.

When a user wants to switch on/off the illumination device 1 and adjust the brightness thereof by blow, the user has to blow air into the casing 10 through the air hole 100 so that the blow sensing module 16 can sense the blow through the air hole 100. Afterward, the driving circuit board 14 controls the light emitting module 12 to emit light in different brightness according to a number of blows sensed by the blow sensing module 16. For example, it is assumed that the light emitting module 12 emits light in 100% brightness (i.e. full brightness) in the beginning. When the user blows air into the air hole 100 once, the driving circuit board 14 may control the light emitting module 12 to emit light from 100% to 50% brightness (i.e. half brightness). When the user blows air into the air hole 100 twice, the driving circuit board 14 may control the light emitting module 12 to emit light from 50% to 25% brightness (i.e. slight brightness). When the user blows air into the air hole 100 three times, the driving circuit board 14 may switched off the light emitting module 12 (i.e. full dark). Accordingly, the user can switch on/off the light emitting module 12 and adjust the brightness thereof by blow through the air hole 100. It should be noted that, the brightness control mechanism of the illumination device 1 of the invention is not limited to the aforesaid three-stage control mechanism. In other words, the brightness control mechanism of the illumination device 1 may be two-stage or more than three-stage according to practical applications.

In this embodiment, the casing 10 may be made of metal material and the cover 18 may be made of ceramic material. As shown in FIG. 1, the casing 10 contacts the cover 18 partially so as to conduct heat generated by the light emitting module 12 from the casing 10 to the cover 18 and then dissipate the heat out of the cover 18, wherein the dotted line shown in FIG. 1 represents a heat conducting path. In other words, the illumination device 1 of the invention may be equipped with the cover 18 made of ceramic material for the purpose of heat dissipation, such that the life of electronic components within the illumination device 1 can increase.

Furthermore, the power storage module 20 is used for supplying power to the driving circuit board 14 during power failure so as to enable the illumination device 1 to work normally during power failure. In other words, the illumination device 1 still can emit light for a span of time during power failure utilizing the power stored in the power storage module 20. In this embodiment, the driving circuit board 14 may switch on the light emitting module 12 in full brightness or switch off the light emitting module 12 according to the number of blows sensed by the blow sensing module 16 during power failure. In other words, the user can only switch on/off the light emitting module 12 by blow so as to save power.

It should be noted that the aforesaid control mechanism of the driving circuit board 14 can be implemented by circuit design and that will not be depicted herein.

Compared with the prior art, the illumination device of the invention utilizes the blow sensing module to sense blow and controls the light emitting module to emit light in different brightness according to the number of blows sensed by the blow sensing module. Accordingly, the user can control the illumination device by blow while both hands are busy. Furthermore, the illumination device of the invention may be equipped with a cover made of ceramic material for the purpose of heat dissipation, such that the life of electronic components within the illumination device can increase. Moreover, the illumination device of the invention may be equipped with a power storage module so as to enable the illumination device to work normally during power failure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An illumination device capable of being controlled by blow comprising:
   a casing, at least one air hole being formed on a periphery of the casing;
   a light emitting module disposed on a top of the casing;
   a driving circuit board disposed in the casing and electrically connected to the light emitting module;
   a blow sensing module disposed in the casing, electrically connected to the driving circuit board, and used for sensing blow through the at least one air hole; and
   a cover having an opening, the casing being disposed in the cover and a part of the casing being exposed within the opening, such that the at least one air hole is located within the cover and exposed within the opening;
   wherein the driving circuit board controls the light emitting module to emit light in different brightness according to a number of blows sensed by the blow sensing module.

2. The illumination device of claim 1, wherein the casing is made of metal material, the cover is made of ceramic material, the casing contacts the cover partially so as to conduct heat generated by the light emitting module from the casing to the cover and then dissipate the heat out of the cover.

3. The illumination device of claim 1, wherein the cover is transparent.

4. The illumination device of claim 1, further comprising a power storage module disposed in the casing, electrically connected to the driving circuit board, and used for supply power to the driving circuit board during power failure.

5. The illumination device of claim 4, wherein the driving circuit board switches on the light emitting module in full brightness or switches off the light emitting module according to the number of blows sensed by the blow sensing module during power failure.

6. The illumination device of claim 1, further comprising a lamp socket fixed on a bottom of the casing.

* * * * *